United States Patent
Singh et al.

(10) Patent No.: US 7,532,460 B2
(45) Date of Patent: May 12, 2009

(54) PORTABLE COMPUTER SYSTEM

(75) Inventors: Satyesh Singh, Chhattisgarh (IN);
Prashant Kumar Singhai, Uttar Pradesh (IN)

(73) Assignee: SAP AG, Walldorf (DE)

( * ) Notice: Subject to any disclaimer, the term of this patent is extended or adjusted under 35 U.S.C. 154(b) by 351 days.

(21) Appl. No.: 11/322,027

(22) Filed: Dec. 29, 2005

(65) Prior Publication Data

US 2007/0153461 A1    Jul. 5, 2007

(51) Int. Cl.
*G06F 1/16* (2006.01)
*G09G 5/00* (2006.01)

(52) U.S. Cl. .............. 361/679.15; 345/156; 361/679.02

(58) Field of Classification Search ......... 361/679–686, 361/724–727; 345/156, 168, 169, 157; 455/575.1, 455/575.3, 575.4
See application file for complete search history.

(56) References Cited

U.S. PATENT DOCUMENTS

| | | | |
|---|---|---|---|
| 2003/0048256 A1* | 3/2003 | Salmon | 345/168 |
| 2005/0146498 A1* | 7/2005 | Hemia et al. | 345/156 |
| 2006/0226040 A1* | 10/2006 | Medina | 206/320 |
| 2006/0248597 A1* | 11/2006 | Keneman | 726/27 |

* cited by examiner

*Primary Examiner*—Jayprakash N Gandhi
*Assistant Examiner*—Nidhi Desai
(74) *Attorney, Agent, or Firm*—Mintz, Levin, Cohn, Ferris, Glovsky & Popeo, P.C.

(57) ABSTRACT

A portable computer system, comprising a flexible monitor that can be rolled into a substantially cylindrical shape when not in use, a flexible keyboard that can be rolled into a substantially cylindrical shape when not in use, a processor, dimensioned to fit within at least one of the flexible monitor and the flexible keyboard when rolled into the substantially cylindrical shape and a power supply unit for supplying power to the portable computer system.

12 Claims, 6 Drawing Sheets

PORTABLE COMPUTER SYSTEM

BACKGROUND OF THE DISCLOSURE

1. Field of the Disclosure

The present disclosure relates generally to computers and in particular, to portable computer systems.

2. Description of the Related Art

Various types of computer systems are available. These computer systems include mainframe systems, desktop systems, laptop systems, etc. Laptop computers are designed to be portable, allowing the user to take their computer with them where ever they go. Although laptop computers are designed and intended to be portable, many potential users avoid them because they are still relatively bulky, heavy and rather difficult to carry.

Various other types of smaller computer systems are also available including personal digital assistants (PDAs), pocket PCs, etc. PDAs such as the Palm Pilot system and the Blackberry system often allow uses to organize their schedule, take notes, perform math calculations, play games, write memos, use email and access the Internet. However, the capabilities of these systems are generally limited because of the small size of the display screen and the keypad and/or other input systems provided. Although folding keyboards which provide a feel of a relatively full size keyboard may be available for some of these smaller computer systems, the displays on these systems still limit their utility for performing, for example, full function word processing, writing of lengthy emails, extensive use of the Internet, etc.

What is needed is a computing system that provides convenient portability and increased usability, while avoiding the disadvantages of conventional computing devices.

SUMMARY

According to a first aspect of the present disclosure, a portable computer system includes a flexible monitor that can be rolled into a substantially cylindrical shape when not in use, a flexible keyboard that can be rolled into a substantially cylindrical shape when not in use, a processor, dimensioned to fit within at least one of the flexible monitor and the flexible keyboard when rolled into the substantially cylindrical shape and a power supply unit for supplying power to the portable computer system.

According to another aspect of the present disclosure, a portable computer system includes a flexible monitor that can be rolled into a substantially cylindrical shape when not in use, a flexible keyboard that can be rolled into a substantially cylindrical shape when not in use, a processor unit comprising processing circuitry and a module unit comprising at least one of a battery pack, memory, hard drive and wireless communication circuitry.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
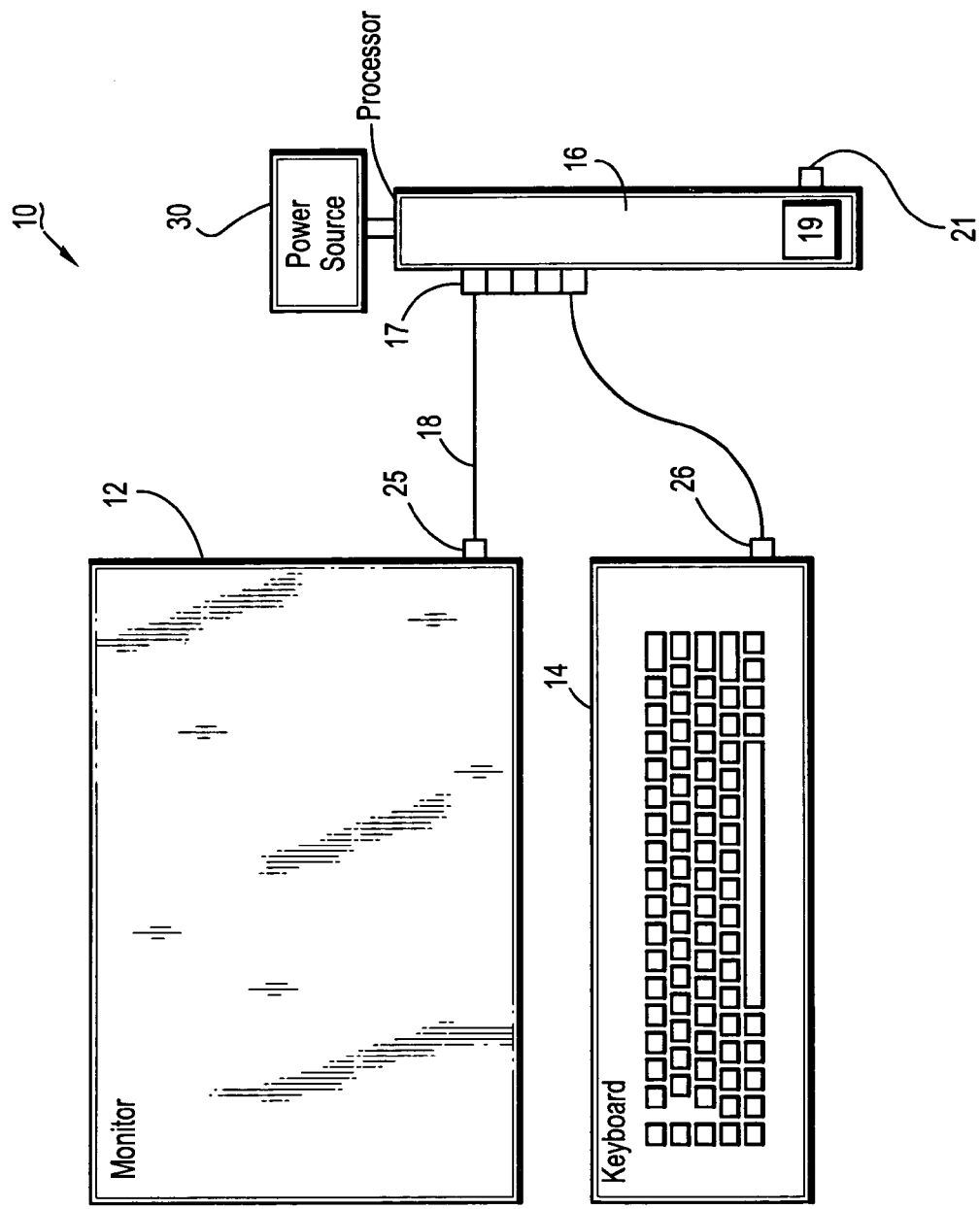
FIG. 1 is a view of a portable computer system according to an embodiment of the present disclosure.

In describing preferred embodiments of the present disclosure illustrated in the drawings, specific terminology is employed for sake of clarity. However, the present disclosure is not intended to be limited to the specific terminology so selected and it is to be understood that each specific element includes all technical equivalents which operate in a similar manner.

A portable computer system, according to an embodiment of the present disclosure is shown in FIG. 1. The portable computer system is shown in the "open" ready to use position in FIG. 1. The portable computer system shown in FIG. 1 may be referred to as system 10 herein. System 10 includes a monitor 12 and a keyboard 14. One or more modules may be provided. For example, according to this embodiment, processor 16 is provided. Of course, other types of modules including power packs, memory, hard drive modules, etc may be provided.

Monitor 12, keyboard 14 and processor 16 are connected via cables 18 and 20, as shown. As described further below, monitor 12 and keyboard 14 can be rolled up into a compact and convenient cylindrical package for ease of carrying. Any module(s) (in this embodiment, processor 16) are dimensioned to fit within the center of the cylindrical package made by rolled up monitor 12 and keyboard 14. On/off switch 21 is provided.

Monitor 12 is a visual display that provides full color and full motion video capabilities. Monitor 12 uses low power and is cable of being viewed in varying light conditions. Monitor 12 is a flat panel display (FPD) that can be rolled up into a substantially cylindrical shape. In one embodiment, monitor 12 is an OLED display using proprietary PHOLED™ technology available from Universal Display Corporation. Examples of other technologies that may be used in monitor 12 include organic light emitting diodes (OLEDs), phosphorescent OLEDs (POLEDs), transparent or top emitting OLEDs (TOLEDs), polymer light emitting diodes (PLEDs) and flexible OLEDs (FOLEDs). Such displays are virtually paper thin, durable, flexible and light.

Keyboard 14 is a "full size" keyboard in that it contains all of the keys of a normal QWERTY keyboard (e.g., 109 keys) for the English language. Of course, as one skilled in the art will appreciate, other keyboard layouts or language formats can be used. The keys are also spaced the same as a normal QWERTY keyboard so that the keyboard has the look and feel of a normal QWERTY keyboard. However, keyboard 14 is flexible and is capable of being rolled up into a substantially cylindrical shape. Of course, other flexible type keyboard arrangements may be utilized including 85 key "compact" keyboards, mini keyboards, etc. Examples of such flexible keyboards include Super Kool Keyboards and those made by AirTouch.

Figure 2:
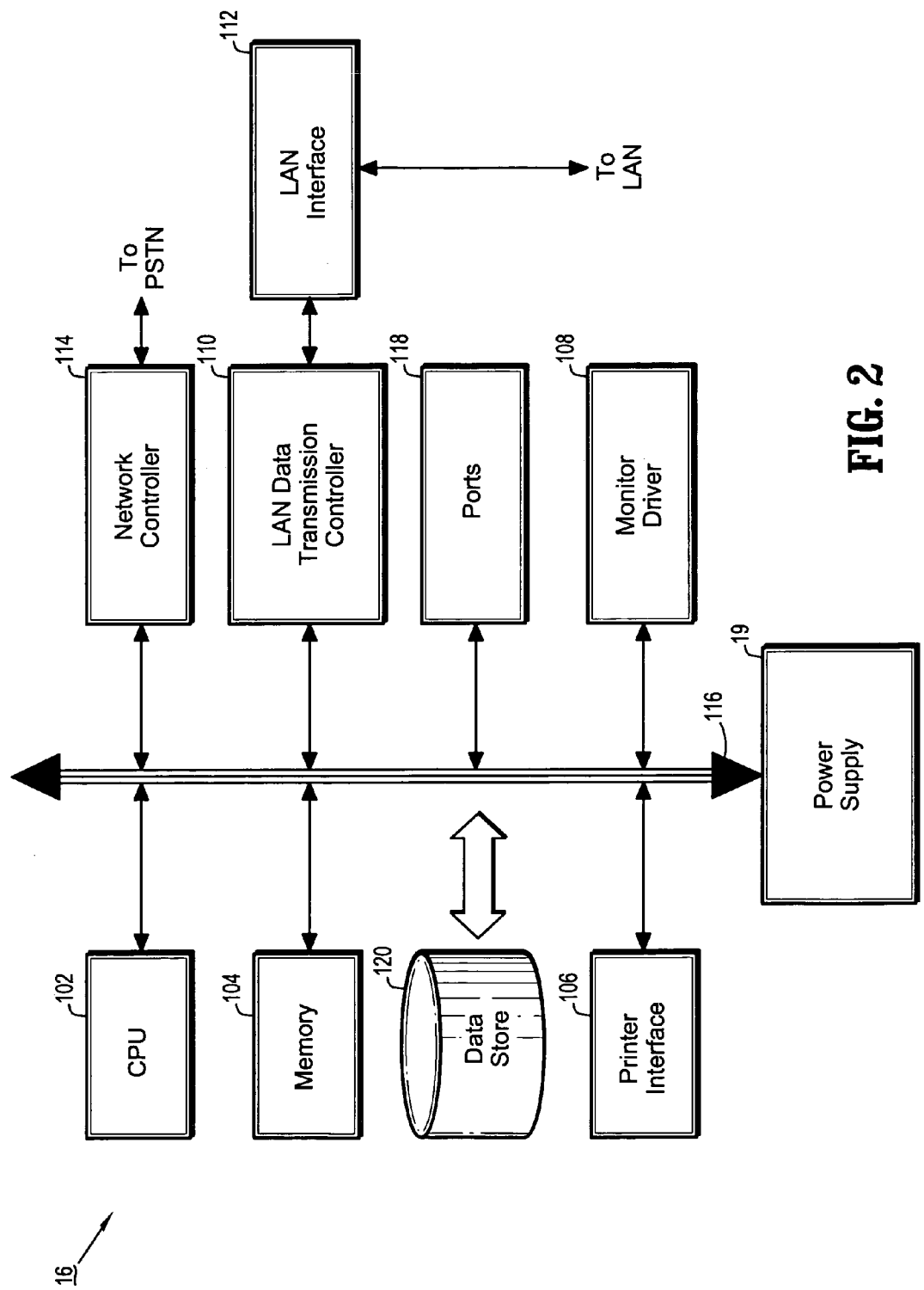
FIG. 2 is a block diagram for describing processing elements according to embodiments of the present disclosure.

Processor 16 is a unit that contains a computer processor including a central processing unit (CPU) and associated circuitry. An example of the components of processor 16 is shown in FIG. 2. As one skilled in the art till appreciate, one or more of these components may be fabricated on a single silicon substrate and/or packaged into a multichip module. Processor 16 may include a central processing unit (CPU) 102, memory 104, for example, Random Access Memory (RAM), Read Only Memory (ROM), etc., a printer interface 106, a monitor unit driver 108, a (LAN) local area network data transmission controller 110, a LAN interface 112, a network controller 114, an internal bus 116 and ports 118 for connecting one or more input/output devices, for example, keyboard 14, monitor 12, a mouse (not shown) etc. The processor 16 may include a data storage device 120. Processor 16 may include a power supply 19 such as a battery pack and/or a port (not shown) for plugging in an external power supply. The external power supply may be, for example, an appropriate AC or DC source of power. As an alternative to providing the power supply within processor 16, the supply for powering system 10 may be in the form of a separate power pack 30 (FIG. 3B) that is removably attached to processor 16 via appropriate connectors (not shown). Power pack 30 can be rechargeable and can be easily replaced with a fresh power pack as necessary. Data storage device 120 may include, for example, RAM, ROM, hard drive, flash memory, etc. or any combination thereof. Processor 16 may also include wireless communication circuitry (not shown) for providing wireless access including wireless access to the Internet.

Processor 16 includes monitor cable 18 and keyboard cable 20 for attaching monitor 12 and keyboard 14, respectively, via connectors 25 and 26. In one embodiment, both power and signal conductors are bundled in a suitable cable that couples via connectors 25 and 26. Processor 16 may include automatic retraction mechanisms so that cables 18 and 20 can be automatically retracted, coiled and stored within the processor 18 and so that connectors 25 and 26 are flush with the surface of processor 16 when the cables are not in use (see FIG. 3B). In another embodiment, power for the monitor 12 and the keyboard 14 can be separately provided, and data signals can be communicated using conventional wireless technology (e.g., Bluetooth) with the processor 16.

Figures 3A, 3B:
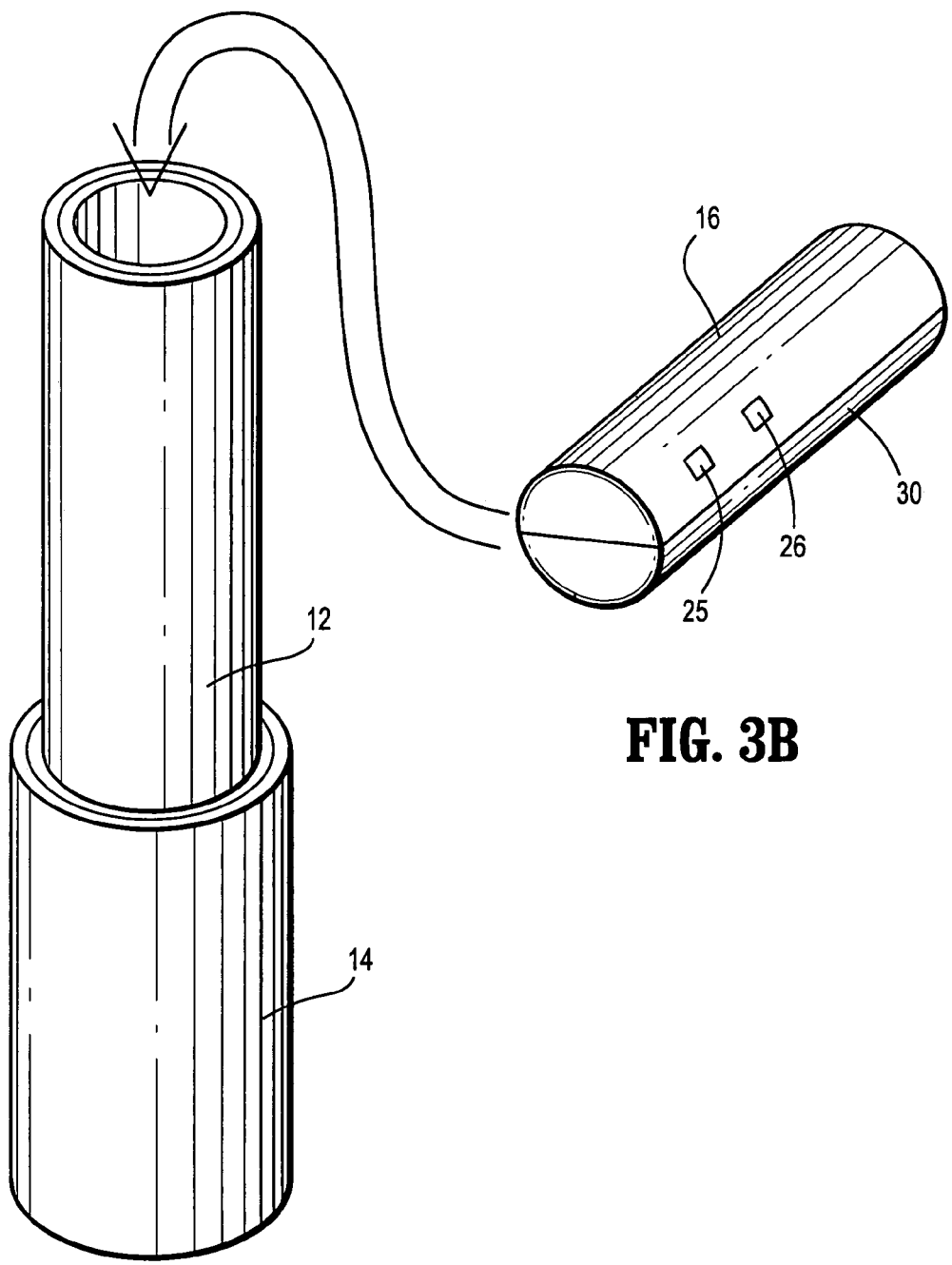
FIGS. 3A and 3B are views of the portable computer system being put into a closed position.

As shown in FIG. 3A, when not in use, monitor 12 can be rolled into a cylindrical shape. Keyboard 14 can then be rolled around the rolled monitor 12. The processor 16 and power pack 30 may each have half round cross-sectional shapes as shown in FIG. 3B. Processor 16 and power pack 30 are dimensioned to fit within the center of the cylinder formed by rolled up monitor 12 and/or keyboard 14. In one implementation, the length of the cylinder comprising the rolled up monitor 12 is approximately 10 inches and the diameter of the cylinder is approximately 1.5 inches.

Depending on the type of monitor and keyboard used, it may be desirable to include one or more foldable support brackets for holding the monitor and/or keyboard in an open position when in use. The support brackets can then be neatly folded into a compact shape for storage when the computer system is not in use.

Other types of input systems are also contemplated by embodiments of the present disclosure. For example, a finger mouse may be provided for moving a cursor and selecting items on the monitor. In addition, other technologies may be utilized in addition to or as alternatives to the keyboard. Examples include a virtual keyboard which can be projected from the monitor or processor unit that registers keystrokes by sensing finger movement. Another technology is by Kitty Tech called Keyboard Independent Touch Typing Technology. This technology can be used to type by placing electric circuits around a user's fingers and sensing movement of the user's fingers into various positions.

Figure 4:
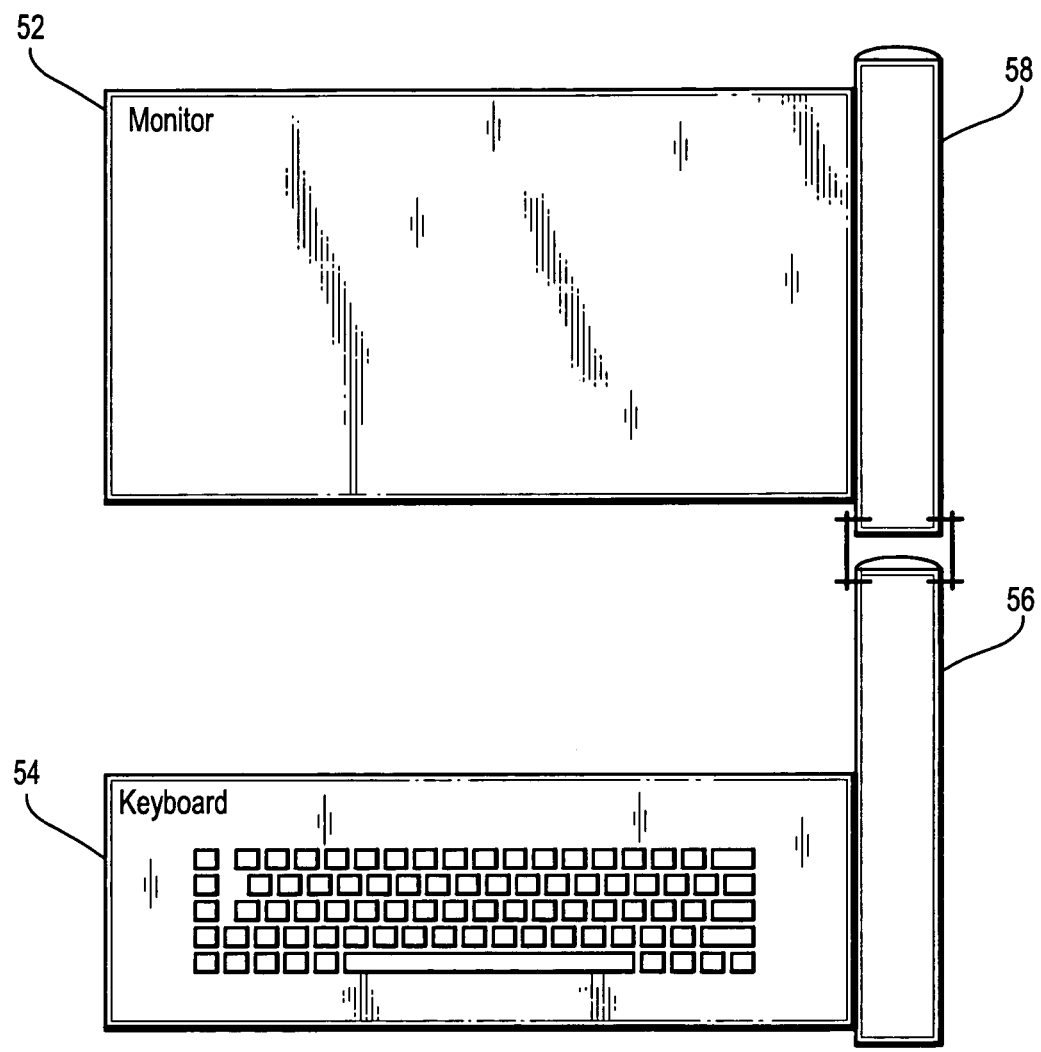
FIG. 4 is a view of a portable computer system according to another embodiment of the present disclosure.

Another embodiment of the present disclosure is shown in FIG. 4 and is referred to as system 50. System 50 includes a flexible monitor 52, flexible keyboard 54, a processor 56 and a module 58. Flexible monitor 52 and flexible keyboard 54 are similar to the flexible monitor and flexible keyboard described above with reference to FIGS. 1-3. However, in this embodiment, one side of monitor 52 is attached to module 58 and one side of keyboard 54 is attached to processor 56.

According to various embodiments of the present disclosure, module 58 may include at least one of a battery pack, memory, hard drive, wireless communication circuitry, etc. or a combination thereof. Processor 56 is a unit that contains the computer processor or central processing unit (CPU) and associated circuitry, an example of which is shown in FIG. 2 and is described above. One or more ports (not shown) may be provided on module 58 or processor 56 for plugging in external input/output devices. For example, according to an embodiment of the present disclosure, processor 56 may include a power source such as a battery pack and a port for plugging in an external power supply and/or charger. The external power supply may be, for example, an appropriate AC or DC source of power. According to an embodiment of the present disclosure, processor 56 may include memory such as RAM, ROM, etc.

Figure 5A:
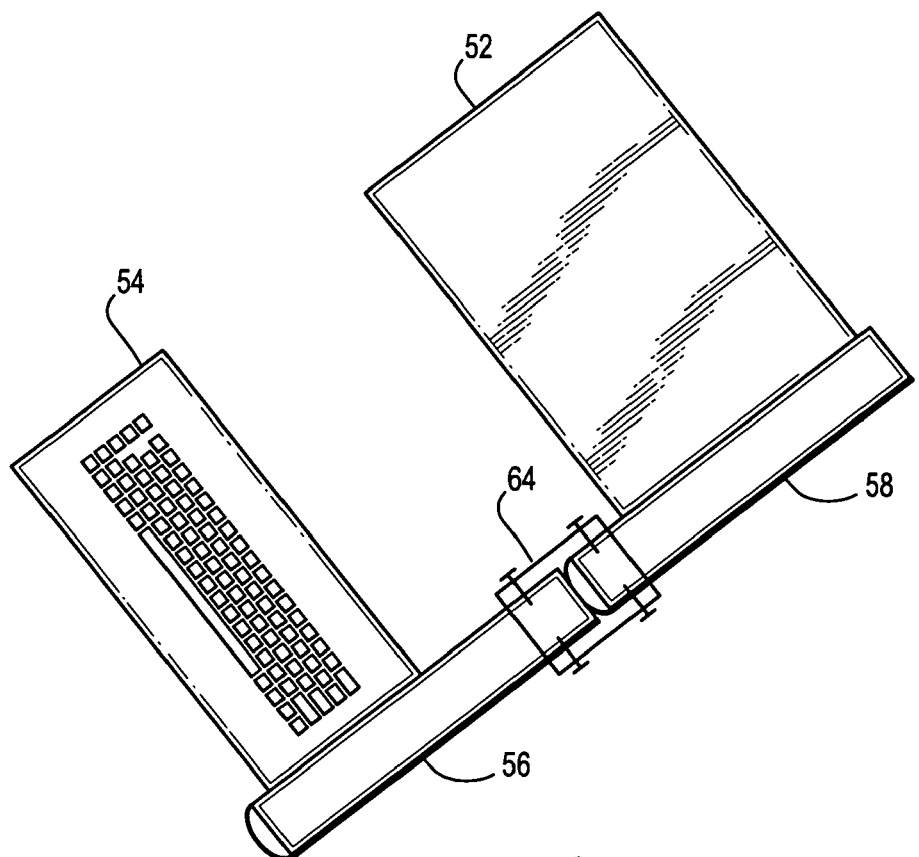
FIGS. 5A and 5B show an embodiment of the present disclosure being put into a closed position.
Figure 5B:
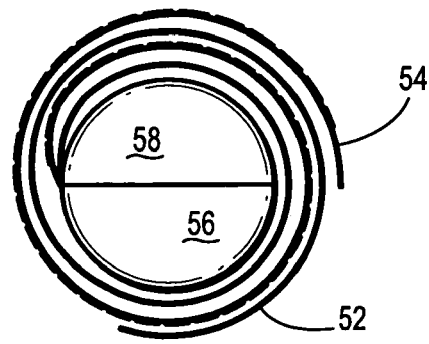

Module 58 includes various types of additional memory and/or storage. For example, module 58 may include RAM, ROM, hard drive, flash memory, a port for attaching a removable memory stick, etc. or any combination thereof. Processor 56 or module 58 may include wireless communication circuitry for providing wireless access to the internet. As shown in FIG. 5A, processor 56 and module 58 have half round cross-sectional shapes and are pivotally attached at one end by pivot assembly 64. System 50 can be folded up so that the flat sides of processor 56 and module 58 can be placed face to face as shown in FIG. 5B. Monitor 52 and keyboard 54 can then be rolled around the folded processor 56 and module 58 to form a light, compact unit.

Figure 6:
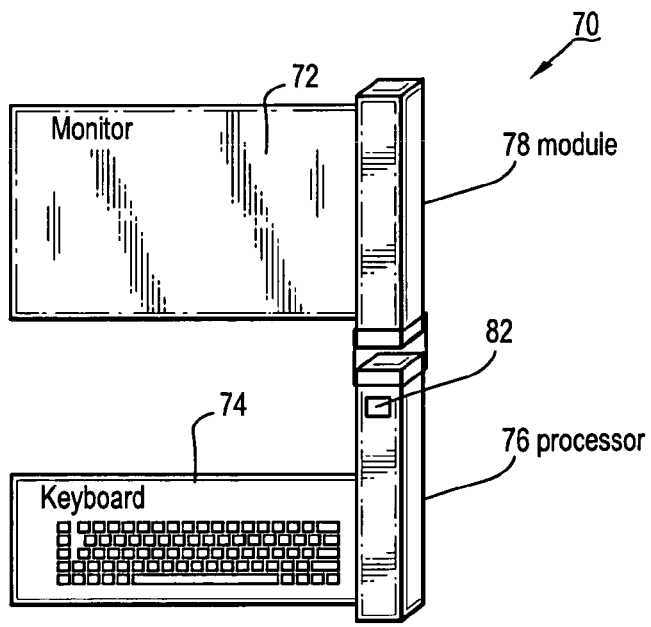
FIG. 6 is a view of a portable computer system according to another embodiment of the present disclosure.

Another embodiment of the present disclosure is shown in FIG. 6 and is referred to as system 70. According to this embodiment of the present disclosure, the monitor and keyboard can be rolled up inside of the processor and module. System 70 includes a flexible monitor 72, flexible keyboard 74, a processor 76 and a module 78. Flexible monitor 72 and flexible keyboard 74 are similar to the flexible monitor and flexible keyboard described in the above embodiment. One side of monitor 72 is attached to module 78 and one side of keyboard 74 is attached to processor 76. As will be described later below, monitor 72 can be coiled up in module 78 and keyboard 74 can be coiled up in processor 76.

According to various embodiments of the present disclosure, module 78 may include at least one of a battery pack, memory, hard drive, wireless communication circuitry, etc. or a combination thereof. Processor 76 is a unit that contains the computer processor or central processing unit (CPU) and associated circuitry, an example of which is shown in FIG. 4 and is described above. One or more ports may be provided on module 78 or processor 76 for plugging in external input/output devices. For example, according to an embodiment of the present disclosure, processor 76 may include a power source such as a battery pack and a port 82 for plugging in an external power supply and/or charger. The external power supply may be, for example, an appropriate AC or DC source of power.

Figure 7A:
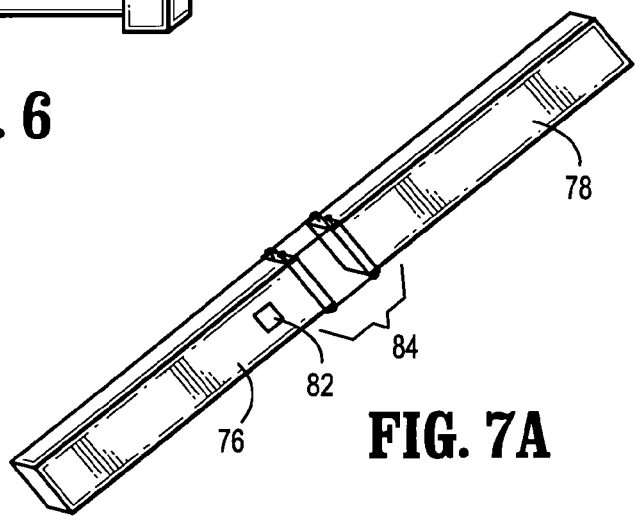
FIGS. 7A-7C show an embodiment of the present disclosure being put into a closed position.
Figure 7B:
Figure 7C:
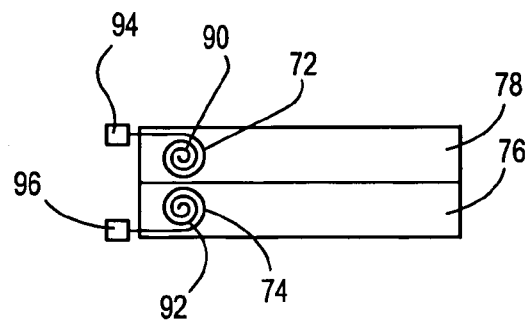

According to an embodiment of the present disclosure, processor 76 may include a minimal amount of memory such as RAM, ROM, etc. Module 78 includes various types of additional memory and/or storage. For example, unit 78 may include RAM, ROM, hard drive, flash memory, a port for attaching a removable memory stick, etc. or any combination thereof. Processor 76 or module 78 may include wireless communication circuitry for providing wireless access to the internet. As shown in FIG. 7A, processor 76 and module 78 are pivotally attached at one end by pivot assembly 84. System 70 can be folded up so that processor 76 and module 78 can be placed face to face as shown in FIG. 7B. As shown in cross section in FIG. 7C, processor 76 includes a spring mechanism 90 for coiling and storing keyboard 74 inside processor 76. Module 78 includes a spring mechanism 92 for coiling and storing monitor 72 inside module 78. Keyboard 74 can be easily pulled from inside processor 76 using pull tab 94. Monitor 72 can be easily pulled from inside module 78 using pull tab 96. Of course, the spring mechanisms for coiling and storing the monitor and keyboard may be replaced by a unit that works manually.

Numerous additional modifications and variations of the present disclosure are possible in view of the above-teachings. It is therefore to be understood that within the scope of the appended claims, the present disclosure may be practiced other than as specifically described herein.

What is claimed is:

1. A portable computer system, comprising:
   a flexible monitor that can be rolled into a substantially cylindrical shape with a first edge of the flexible monitor overlapping and enclosing a second edge of the flexible monitor when not in use;
   a flexible keyboard that can be rolled into a substantially cylindrical shape with a first edge of the flexible keyboard overlapping and enclosing a second edge of the flexible keyboard when not in use;
   a processor, dimensioned to fit within at least one of the flexible monitor and the flexible keyboard when rolled into the substantially cylindrical shape; and
   a power supply unit for supplying power to the portable computer system:
   wherein:
      the processor and the power supply are pivotally connected for folding together into a closed position;
      the keyboard is connected to the processor and the monitor is connected to the power supply unit; and
      the keyboard and the monitor are rolled around the processor and power supply unit when in the closed position.

2. The portable computer system as recited in claim 1, further comprising a memory for storing data, wherein at least one of the power supply and the memory are provided in a same physical unit as the processor.

3. The portable computer system as recited in claim 1, further comprising connectors for interconnecting at least two of the flexible monitor, the flexible keyboard and the processor.

4. The portable computer system as recited in claim 1, further comprising a memory for storing data, wherein the power supply and the memory further comprise connectors for connecting the power supply and the memory to at least one of the flexible monitor, the flexible keyboard and the processor.

5. The portable computer system as recited in claim 1, wherein at least one of the flexible keyboard and flexible monitor are wirelessly coupled to the processor.

6. The portable computer system as recited in claim 1, further comprising at least one bracket for holding at least one of the flexible keyboard and flexible monitor in an open position when in use.

7. A portable computer system, comprising:
   a flexible monitor that can be rolled into a substantially cylindrical shape when not in use;
   a flexible keyboard that can be rolled into a substantially cylindrical shape when not in use;
   a processor unit comprising processing circuitry; and
   a module unit comprising at least one of a battery pack, memory, hard drive and wireless communication circuitry;
   wherein:
      one of the flexible monitor or the flexible keyboard can be rolled around and more than completely encircle the other of the flexible monitor or the flexible keyboard;
      the flexible monitor is attached to the module unit and the flexible keyboard is attached to the processor unit; and
      the module unit and the processor unit further comprise coiling units for coiling and storing the flexible monitor and the flexible keyboard, respectively, when not in use.

8. The portable computer system as recited in claim 7, wherein the processor unit and the module unit are pivotally connected for folding together into a closed position.

9. The portable computer system as recited in claim 7, wherein at least one of the flexible keyboard and flexible monitor are wirelessly coupled to the processor.

10. The portable computer system as recited in claim 7, further comprising at least one bracket for holding at least one of the flexible keyboard and flexible monitor in an open position when in use.

11. A method for storing a computing system, comprising:
    rolling a first component into a substantially cylindrical form with a first edge of the first component overlapping a second edge of the first component and having a central opening;
    rolling a second component around the first component, a first edge of the second component overlapping a second edge of the second component; and
    disposing a third component into the central opening;
    wherein the third component comprises at least one of a processor, a power supply and data storage.

12. The method as recited in claim 1, wherein the first component comprises at least one of a flexible monitor and a flexible keyboard and the second component comprises the other of the at least one of the flexible monitor and the flexible keyboard.

* * * * *